United States Patent [19]

Hanna et al.

[11] Patent Number: 5,523,385
[45] Date of Patent: Jun. 4, 1996

[54] POLYMERIZATION OF CARBON MONOXIDE AND ETHYLENE USING CATALYST CONTAINING NON-COORDINATING, NON-ACIDIC ANION

[75] Inventors: Paul K. Hanna, East Windsor, N.J.; Andrzej M. Piotrowski, Peekskill, N.Y.; Kelly B. Triplett, Stamford, Conn.

[73] Assignee: Akzo Nobel N. V., Arnhem, Netherlands

[21] Appl. No.: 466,321

[22] Filed: Jun. 6, 1995

Related U.S. Application Data

[62] Division of Ser. No. 339,096, Nov. 14, 1994.

[51] Int. Cl.⁶ .............................. C08G 67/02; C08F 4/48
[52] U.S. Cl. .................... 528/392; 502/103; 502/117; 502/118; 502/129
[58] Field of Search ................ 528/392; 502/103, 502/117, 118, 129, 132

[56] References Cited

U.S. PATENT DOCUMENTS

| | | | |
|---|---|---|---|
| 4,983,649 | 1/1991 | Smutny | 524/13 |
| 4,999,399 | 3/1991 | Smutny | 525/185 |
| 5,049,630 | 9/1991 | Smutny | 525/539 |
| 5,153,157 | 10/1992 | Hlatky et al. | 502/117 |
| 5,187,258 | 2/1993 | Smith | 528/392 |
| 5,194,210 | 3/1993 | Lommerts et al. | 264/184 |
| 5,216,120 | 6/1993 | Drent et al. | 528/392 |
| 5,243,026 | 9/1993 | Gautier et al. | 528/392 |
| 5,245,123 | 9/1993 | Drent et al. | 528/392 |
| 5,352,767 | 10/1994 | Chien | 528/392 |

FOREIGN PATENT DOCUMENTS

| | | | |
|---|---|---|---|
| 310171 | 4/1989 | European Pat. Off. | D01F 6/30 |
| 360358 | 3/1990 | European Pat. Off. | D01F 6/30 |
| 0590942 | 4/1994 | European Pat. Off. | C08G 67/02 |
| 619335 | 10/1994 | European Pat. Off. | C08G 67/02 |
| WO90/14453 | 11/1990 | WIPO | D01F 6/30 |
| WO94/00623 | 1/1994 | WIPO | D01F 6/30 |

OTHER PUBLICATIONS

E. Drent et al., "Efficient Palladium Catalysts for the Copolymerization of Carbon Monoxide with Olefins to Produce Perfectly Alternating Polyketones", Journal of Organometallic Chemistry, 417 (1991) 235–251.

M. Brookhart et al., "Palladium (II) Catalysts for Living Alternating Copolymerization of Olefins and Carbon Monoxide", J. Am. Chem. Soc. 1992, 114, 5894–5895.

P. K. Wong et al., "Palladium–Catalyzed Alternating Copolymerization of Propylene and Carbon Monoxide. Formation of Poly(spiroketal/ketone)", Ind. Eng. Chem. Res. 1993, 32, 986–988.

S. H. Strauss, "The Search for Larger and More Weakly Coordinating Anions", Chem. Rev. 1993, 927–942.

A. Sen, "Mechanistic Aspects of Metal–Catalyzed Alternating Copolymerization of Olefins with Carbon Monoxide", Acc. Chem. Res. 1993, 26, 303–310.

Primary Examiner—Shelley A. Dodson
Attorney, Agent, or Firm—Richard P. Fennelly; Louis A. Morris

[57] ABSTRACT

Carbon monoxide and ethylene are polymerized in the presence of a catalytically effective amount of a catalyst formed from a Group VIII metal source, such as palladium, a bidentate ligand containing a Group VA or VIA heteroatom, such as phosphorus, and an anion which is a non-coordinating, non-acidic tetrasubstituted anion containing a Group IIIA element, such as boron, with the anion preferably being either an unsubstituted or substituted boron tetraphenyl compound. The catalyst is advantageously formed by the exchange reaction of a ligand-conjugated Group VIII metal salt with a salt containing the non-coordinating, non-acidic tetrasubstituted anion containing the Group IIIA element in a solvent medium which causes the separation (due to differing solubilities) of the desired catalyst from the by-product of the reaction which comprises the anion from salt which was used as the Group VIII metal source and the cation from the salt used as the source of the non-coordinating, non-acidic tetrasubstituted anion containing the Group IIIA element. The resulting polyketone product has novel thermal stability characteristics.

7 Claims, No Drawings

POLYMERIZATION OF CARBON MONOXIDE AND ETHYLENE USING CATALYST CONTAINING NON-COORDINATING, NON-ACIDIC ANION

This is a division of application Ser. No. 08/339,096 filed Nov. 14, 1994.

BACKGROUND OF THE INVENTION

It is known to select, as anions, in catalysts for polyketone polymer production which are formed from a Group VIII metal, such as palladium, and a bidentate ligand containing a Group V or VI heteroatom, such as phosphorus, coordinating, acidic species, such as those formed from (a) a 2:1 reaction mixture of a substituted salicylic acid and boric acid (U.S. Pat. No. 5,187,258 to K. G. Smith), (b) tetrafluoroboric acid (U.S. Pat. Nos. 5,216,120 to E. Drent et al. and 5,243,026 to P. A. Gautier et al.), and (c) boron trifluoride diethyl ether etherate (U.S. Pat. No. 5,245,123 to E. Drent et.al.). The use of catalysts of this type, which leave acidic catalyst residues in the polyketone product or will form acidic species in the polymer during its thermal decomposition, are less than fully desired for use especially when the polyketone is one made from carbon monoxide and ethylene and is intended for use in environments where good temperature stability is desired.

More recent U.S. Pat. No. 5,352,767 to J. C. W. Chien illustrates the use of non-coordinating tetrasubstituted monoboron anions, such as boron tetraphenyl and boron tetra(pentafluorophenyl) in the polymerization of polyketone polymers containing an α-olefin containing no less than three carbon atoms. This patent teaches away from the use of ethylene as a comonomer for the polymerization reaction (See, for example, Col. 6, lines 46–49 and Col. 7, lines 4–15) even though it discloses use of catalyst systems which can be considered to be non-acidic.

European Patent Publication No. 619,335 to BP Chemicals Ltd. contains a disclosure of using certain boron hydrocarbyl compounds as anions in catalysts for the synthesis of a polyketone polymer. The main thrust of this patent disclosure is the use of Lewis acidic, trisubstituted boron compounds of the formula BXYZ, where at least one of X, Y, or Z is a monovalent hydrocarbyl group. This patent contains an isolated, inconsistent mention of certain tetrasubstituted boron species at page 3, lines 48–53 without any other disclosure indicating that such species, which would be non-acidic, as defined hereinbelow, rather than acidic, were ever used to make polyketone polymers. The disclosure of these tetrasubstituted boron species is inconsistent with the main thrust of the disclosure of using Lewis acid species (e.g., Claim 2).

SUMMARY OF THE INVENTION

The present invention relates, in one embodiment, to a process for the production of a polyketone by the polymerization of carbon monoxide and ethylene in the presence of a catalytically effective amount of a catalyst formed from a Group VIII metal source, such as palladium, a bidentate ligand containing a Group VA or VIA heteroatom, such as phosphorus, and an anion which is a non-coordinating, non-acidic tetrasubstituted anion containing a Group IIIA element, such as boron, with the anion preferably being either an unsubstituted or substituted boron tetraphenyl compound. The invention also relates to a facile synthesis procedure for making the catalyst by the exchange reaction of a ligand-conjugated Group VIII metal salt with a salt containing the non-coordinating, non-acidic tetrasubstituted anion containing the Group IIIA element in a solvent medium which causes the separation (due to differing solubilities) of the desired catalyst from the by-product of the reaction which comprises the anion from salt which was used as the Group VIII metal source and the cation from the salt used as the source of the non-coordinating, non-acidic tetrasubstituted anion containing the Group IIIA element.

As used herein, the term "non-acidic" in defining the nature of the above-described anion is intended to indicate that when a catalyst containing that anion is used to make the carbon monoxide-ethylene polyketone such a polyketone product has a substantially enhanced resistance to thermal degradation, when melt processed, as compared to a comparable polyketone formed using known catalyst systems containing anions derived from such acidic materials as para-toluene sulfonic acid, trifluoroacetic acid, tetrafluoroboric acid, or trihydrocarbyl-substituted boron species.

DESCRIPTION OF PREFERRED EMBODIMENTS

The present invention relies upon the novel use of certain of the catalyst systems described in the above-referenced Chien patent for use in the formation of a polyketone polymer from carbon monoxide and ethylene, rather than the polyketone polymers synthesized by Chien which utilized, as essential comonomers therein, α-olefins having a higher carbon content than the ethylene comonomer of the present invention. The Chien patent, however, is incorporated herein by reference for its teaching of the general polymerization conditions which may be used for synthesizing polyketones as well as its generalized description of how its catalyst systems can be formed.

The catalyst system, as used in connection with the present invention, in its broadest embodiments, is formed from a Group VIII metal source, a bidentate ligand containing a Group VA or VIA heteroatom, and an anion which is a non-coordinating, non-acidic tetrasubstituted anion containing a Group IIIA element.

The terminology "Group VIII metal source" as used herein, is to be construed as covering those conventionally used compounds which have traditionally been employed in making catalysts for the polymerization of carbon monoxide and an olefin. The preferred Group VIII metal is palladium and sources of this metal include tetrakis(acetonitrile) palladium tetrafluoroborate.

Likewise, the terminology "a bidentate ligand containing a Group VA or VIA heteroatom" is to be construed as covering those bidentate ligands containing nitrogen, phosphorus (as preferred), arsenic, or antimony heteroatoms which have been traditionally employed in making catalysts for the polymerization of carbon monoxide and an olefin. These bidentate ligands have the general formula $(R^1)_2$—M—$R^2$—M—$(R^1)_2$, where M is one of the aforesaid heteroatoms, $R^1$ is alkyl, cycloalkyl, or phenyl, with lower alkyl or phenyl being preferred, and $R^2$ being alkylene, such as propylene. This type of ligand may be used in an amount ranging from about 0.5 mole to about 2 moles per mole of Group VIII metal, most preferably 1 mole per mole of metal.

In the particular catalyst chosen for use in making the carbon monoxide-ethylene polyketone product, the anion is a non-coordinating, non-acidic tetrasubstituted anion containing a Group IIIA element, such as boron (which is preferred) or aluminum. These type of large bulky anions may be further exemplified by boron tetraphenyl compounds, either by unsubstituted boron tetraphenyl itself or by a substituted compound of that type, such as the fully halogen substituted boron tetra(pentafluorophenyl). The amount of this anion may range from about 1 to about 10 moles per mole of palladium, preferably from about 1 to about 2 moles per mole of palladium.

The catalyst is advantageously formed by the exchange reaction of a ligand-conjugated Group VIII metal salt with a salt containing the non-coordinating, non-acidic tetrasubstituted anion containing the Group IIIA element in a solvent medium which causes the separation (due to differing solubilities) of the desired catalyst from the by-product of the reaction which comprises the anion from salt which was used as the Group VIII metal source and the cation from the salt used as the source of the non-coordinating, non-acidic tetrasubstituted anion containing the Group IIIA element.

In selecting the type of salts and solvent(s) to be used as reagents in the aforesaid exchange reaction it is necessary to follow certain general rules. The two respective salt reagents which respectively contribute the ligand-Group VIII cation and non-coordinating, non-acidic anion need to be dissolved in an appropriately selected solvent. Upon mixing of these two reagent solutions, it is necessary, however, for the exchange reaction to occur forming two new salts, one of which having a substantially more insoluble nature than the other so that separation of the desired catalyst from the by-product can occur. This can be accomplished if one insures that at least one "hard" ion pair is used in situations where a non-polar solution is used and vice-versa.

More specifically, the process entails the initial dissolving, in an appropriate solvent, such as acetonitrile, of a source of the Group VIII metal. Then, a solution (e.g., in methylene chloride) of the bidentate ligand is added to the previously described solution to form the ligand-conjugated species, also in solution, which forms one of the actual reagents. The next step is to react such a reagent species, which is dissolved in the thus produced solution, with a salt reagent (containing, as an anion, the non-coordinating, non-acidic anion comprising the Group IIIA element) forming, via exchange reaction, the desired catalyst and a by-product which each have differing solubilities in the resulting solvent medium so as to separate therefrom. The cation used with the salt reagent comprising the anion desired in the final catalyst can be an alkali metal, such as lithium. The net result of the entire process is the, for example, the production of a solubilized catalyst species, containing the ligand-Group VIII metal moiety, as cation, and the non-coordinating, non-acidic anion, with the production of a precipitated and removed by-product comprising the cation originally associated with the non-coordinating, non-acidic anion when in the final catalyst and the original anion associated with the ligand-conjugated Group VIII metal-containing cation.

If desired, the organic oxidizing agent component (e.g., 1,4-benzoquinone) identified at Col. 5, lines 15–26 of U.S. Pat. No. 5,216,120 of E. Drent et al. may be added as an optional additive to prolong the life of the instant catalyst at the levels disclosed therein.

The catalyst described herein for use in the manufacture of a polyketone from carbon monoxide and ethylene can be used in those polymerization procedures known to persons of ordinary skill in the art for making such a polyketone polymer using amounts of the catalyst as conventionally employed and ratios of carbon monoxide to ethylene also as conventionally employed. U.S. Pat. No. 5,216,120 of E. Drent et al. at Col. 5, line 55 to Col. 6, line The present invention will be further illustrated by the Examples which follow.

EXAMPLES 1–4

The catalysts used in these Examples was of the formula $(Ph_2P(CH_2)_3PPh_2)Pd(CH_3CN)_2$ $2B(C_6F_5)_4$.

The method used to prepare this catalyst comprised the following steps: 0.11 g of $Pd(CH_3CN)_4$ $2BF_4$ was dissolved in 1 ml of acetonitrile, followed by addition of a solution of 0.105 g of $Ph_2P(CH_2)_3PPh_2$ in 2 ml of methylene chloride, followed by addition of a solution of 0.35 g of $LiB(C_6F_5)_4$ in 2 ml of methylene chloride. The product was a yellow-orange solution. The solvent was removed under vacuum. The residue which remained was dissolved in 6 ml of methylene chloride and, when applicable, 0.11 g of 1,4 benzoquinone in 2 ml of methylene chloride was added. The insoluble material was filtered off and the solution was placed into a 1 liter autoclave containing 600 ml of methanol at the desired temperature, and then the autoclave was pressurized with carbon monoxide:ethylene (1:1) to 360 psig. The polymerization rates given in the table below are given in terms of grams of polymer produced per gram of palladium per hour. All reactions were terminated after two hours.

| Run No. | Benzoquinone (g) | Temp. (°C.) | Polymer. Rate at | | | Wt. of Polymer |
|---|---|---|---|---|---|---|
| | | | 15 min. | 1 hour | 2 hours | |
| 1 | 0 | 50 | 800 | 1000 | 940 | 36.1 g |
| 2 | 0.11 | 50 | 1100 | 1370 | 1550 | 47.0 g |
| 3 | 0.11 | 62 | 1600 | 1880 | 1730 | 71.6 g |
| 4 | 0.11 | 75 | 2500 | 2600 | 2300 | 83.6 g |

EXAMPLES 5–10

The catalyst used in these Examples was of the formula $(Ph_2P(CH_2)_3PPh_2)Pd(CH_3CN)_2$ $2BPh_4$.

The catalyst was prepared by dissolving 0.11 g of $Pd(CH_3CN)_4$ $2BF_4$ in a mixture of 4 ml of acetonitrile and 1 ml of methylene chloride followed by the addition of a solution of 0.105g (one equivalent) of $Ph_2P(CH_2)_3PPh_2$ in 2 ml of methylene chloride. A solution of 0.17 g of $NaBPh_4$ in a mixture of 2 ml of acetonitrile and 4 ml of methylene chloride was then added. A white precipitant formed. The precipitant that was formed was $NaBF_4$, and the compound $(Ph_2P(CH_2)_3PPh_2)Pd(CH_3CN)_2$ $2BPh_4$ that was formed remained in solution as shown by $^1H$ and $^{19}F$ NMR spectroscopy. The precipitant was filtered off, and the solution was injected into a 1 liter autoclave containing 600 ml of methanol as a polymerization solvent and pressurized with 1:1 carbon monoxide and ethylene to 360 psig. All reactions were terminated after two hours.

The Table which follows illustrates the results which were obtained (In certain runs in the Table given below, 1,4-benzoquinone (0.11 g) in 2 ml of methylene chloride was also used):

| Run No. | Temp. (°C.) | Press. (bar) | Benzoquin-one (eq) | Wt. (g) | MeOH (ml) | $CH_3NO_2$ (ml) | Bar/hr 15/60/120 (min) | Polym. Rate at 15 min.* | Percent Rate Retention at 1 hr. | 2 hrs. | LVN |
|---|---|---|---|---|---|---|---|---|---|---|---|
| 5 | 50 | 26 | 0 | 8.6 | 300 | 300 | 92/0 | 400 | 25 | 0 | — |
| 6 | 50 | 26 | 4 | 13.5 | 300 | 300 | 21/0/0 | 1000 | 0 | 0 | 0.8 |
| 7 | 50 | 26 | 4 | 40.9 | 2 | 600 | 25/21/19 | 1200 | 83 | 75 | 4.0 |
| 8 | 50 | 26 | 4 | 29.8 | 0 | 600 | 17/14/11 | 840 | 83 | 65 | 5.3 |
| 9 | 50 | 26 | 4 | 21.2 | 600 | 0 | 9/8/8 | 440 | 91 | 91 | 3.9 |
| 10 | 50 | 26 | 4 | 29.7 | (Pure Acetone) | | 9/15/12 | 450 | 156 | 122 | 2.9 |

*the polymerization rate is expressed as g polyketone/g Pd/hr.

EXAMPLE 11

The thermal stability of the product from Example 9 was tested in this Example.

The test (as described in U.S. Pat. Nos. 4,983,649, 4,999,399 and 5,049,630) involves the measurement of the heats of crystallization of the polymer before and after exposure to high temperature for a given period of time. The result is a number ($C_2/C_1$) of between 0 and 1.0 with 1.0 indicating a perfect thermal stability. In the foregoing patents the unstabilized product showed values of 0.78, 0.81, and 0.83, respectively, after heating to 285° C. for ten minutes. In contrast, the unstabilized sample from Example 9 showed a superior thermal stability of 0.97 when heated to the more severe conditions of 295° C. for ten minutes. If the material of this Example were heated at 285° C. the stability value would be in excess of 0.97.

The polyketone product having a thermal stability values, as described above, of no less than 0.90, preferably no less than about 0.95, are deemed to be novel compositions as well as thermally processed products thereof (e.g., formed articles, fibers, food packaging, etc.).

The foregoing Examples should not be construed in a limiting sense since they are intended to merely illustrate certain embodiments of the present invention. The scope of protection sought is set forth in the claims which follow.

We claim:

1. A process for the formation and isolation of a catalyst used in a process for the production of a polyketone, which comprises the polymerization of carbon monoxide and ethylene in the presence of a catalytically effective amount of a catalyst formed from a Group VIII metal source, a bidentate ligand containing a Group VA or VIA heteroatom, and an anion which is a non-coordinating, non-acidic tetrasubstituted anion containing a Ground IIIA element, which process for the formation and isolation of the catalyst comprises the exchange reaction, in a solvent medium, of (i) a ligand-conjugated Group VIII metal salt with (ii) a salt containing the non-coordinating, non-acidic tetrasubstituted anion containing the Group IIIA element which exchange reaction produces the catalyst and a by-product comprising the anion from the salt (i) which was used as the Group VIII metal source and the cation from the salt (ii) used as the source of the non-coordinating, non-acidic tetrasubstituted anion containing the Group IIIA element, with the separation, due to their differing solubilities in the solvent, of the desired catalyst and the by-product.

2. A process as claimed in claim 1 wherein the salt (i) comprises a boron tetrafluoride anion and salt (ii) comprises an alkali metal cation so as to produce a precipitated by-product.

3. A process as claimed in claim 2 wherein the alkali metal cation is lithium.

4. A process as claimed in claim 2 wherein the salt (i) comprises palladium as the Group VIII metal and a boron tetrafluoride anion and salt (ii) comprises an alkali metal cation so as to produce a precipitated by-product.

5. A process as claimed in claim 4 wherein the alkali metal cation is lithium.

6. A process as claimed in claim 2 wherein the salt (i) comprises palladium as the Group VIII metal, a bidentate ligand containing phosphorus, and a boron tetrafluoride anion and salt (ii) comprises an alkali metal cation so as to produce a precipitated by-product.

7. A process as claimed in claim 6 wherein the alkali metal cation is lithium.

* * * * *